United States Patent
Carmon

(10) Patent No.: US 9,408,100 B2
(45) Date of Patent: Aug. 2, 2016

(54) DEVICE AND METHOD FOR PERFORMING OPPORTUNISTIC SNIFFING

(71) Applicant: Broadcom Corporation, Irvine, CA (US)

(72) Inventor: Rafael Carmon, Rishon Lezion (IL)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/929,371

(22) Filed: Jun. 27, 2013

(65) Prior Publication Data

US 2015/0004968 A1    Jan. 1, 2015

(51) Int. Cl.
*H04W 4/00*    (2009.01)
*H04W 24/10*    (2009.01)
*H04W 24/08*    (2009.01)

(52) U.S. Cl.
CPC .............. *H04W 24/10* (2013.01); *H04W 24/08* (2013.01)

(58) Field of Classification Search
CPC ..................................................... H04W 24/10
USPC ................ 455/456.6, 450, 436, 434; 370/329
See application file for complete search history.

(56) References Cited

U.S. PATENT DOCUMENTS

| | | | | |
|---|---|---|---|---|
| 2009/0312023 | A1* | 12/2009 | Kazmi | 455/436 |
| 2010/0208674 | A1* | 8/2010 | Lee et al. | 370/329 |
| 2012/0172048 | A1* | 7/2012 | Kato et al. | 455/450 |
| 2013/0059610 | A1* | 3/2013 | Siomina et al. | 455/456.6 |
| 2014/0038606 | A1* | 2/2014 | Jang | 455/436 |

FOREIGN PATENT DOCUMENTS

SE    WO 2010044721 A1 *    4/2010    ............ H04L 1/1883

* cited by examiner

*Primary Examiner* — David Q Nguyen
(74) *Attorney, Agent, or Firm* — Sterne, Kessler, Goldstein & Fox PLLC

(57) ABSTRACT

Recent LTE communications schemes utilize such large amounts of data traffic, that there is little available bandwidth for performing sniffing of nearby base stations and/or cells, which is often integral in performing carious calibrations. Utilizing an LTE scheduler, small data traffic gaps can be detected in one or both of the receive chain and transmit chain. During these data traffic gaps, portions of sniffing data can be acquired and stored without significant interruption to the communication chains, where the overall process may be referred to as "blinking." Over time, these portions can be accumulated in memory until a sufficient. Over time, these portions can be accumulated in memory until a sufficient amount of sniffing data has been acquired. Once sufficient data has been acquired, sniffing analysis can be performed in the background on the combined data.

21 Claims, 5 Drawing Sheets

DEVICE AND METHOD FOR PERFORMING OPPORTUNISTIC SNIFFING

BACKGROUND

1. Field

The disclosure relates to a wireless communication device and method, and specifically to performing opportunistic sniffing in a wireless communication environment.

2. Related Art

In a wireless communication environment, wireless service coverage is provided to users or subscribers by a plurality of nodes, and each node provides a corresponding cell of wireless service coverage. Particularly in small cells and femto cells, it is generally important for their serving nodes to perform sniffing of neighboring/nearby nodes in order to perform calibration, handover processing, timing synchronization, and other functions. Sniffing can be on the same or different Radio Access Technologies (GSM, 3G, LTE, etc.).

Conventionally, a serving femto/small cell seeking to sniff neighboring cells would stop for a significant period of time its transmission and/or reception service with its subscribers. During this communication break, the small cell then performs full sniffing, in which it acquires and processes all needed data to perform its analysis.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
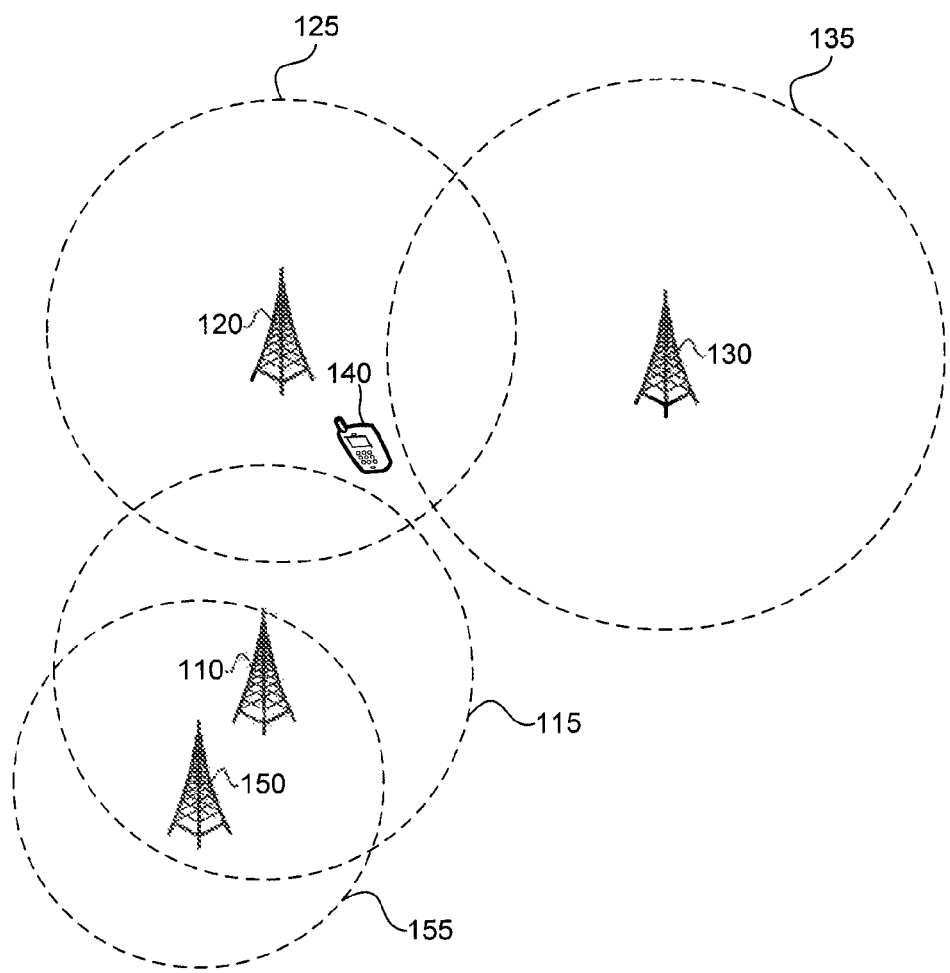
FIG. 1 illustrates an exemplary wireless communication environment according to an exemplary embodiment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to be limiting.

Embodiments xray be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, processor, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various wireless systems, and should not be limited to small/femto cells.

An Exemplary Wireless Communication Environment

FIG. 1 illustrates an exemplary wireless communication environment 100 according to an exemplary embodiment. The wireless communication environment includes one or more full base stations (120/130) and one or more small/ femto base stations (110/150) (hereinafter commonly referred to as "small" cell). Each base station provides wireless connectivity to a corresponding service cell or area. For example, full base station 120 provides a service cell 125, full base station 130 provides a service cell 135, and small base stations 110 and 150 provide service cells 115 and 155, respectively.

A subscriber device 140 within the environment 100 wirelessly connects to the network by communicating with a serving cell. For example, as shown in FIG. 1, because of the location of the subscriber device 140, it will be connected to the network via the fall base station 120. However, as the subscriber device moves south, it may perform a handover in order to switch from the full base station 120 to the small cell 115. As the device 140 moves even further south, another handover may occur from the small cell 110 to the small cell 150. In this manner, the device 140 can maintain connectivity while moving in and out of various cellular coverage areas.

The base stations in the environment assist in determining whether the device 140 should perform the handover by measuring nearby cells. In order to perform this measuring, the serving cell must "sniff" those neighboring cells. In other words, the serving cell acquires wireless signals from the neighboring cells. After enough data has been acquired, and analysis takes place. From the analysis, the serving cell can assist the device 140 in determining whether the initiate a handover to the neighboring cell. Accordingly, sniffing can include scanning a radio receiver over frequency to receive known frequencies of various RATs, and determining corresponding signal amplitudes and other signal characteristics that can be used to determine base-station or RAT availability. Sniffing is important for calculating and refining other parameters as well, including timing, neighbor cell list, parameters required for unique self-configuration, interference measurement, limiting the transmission power, etc. In conventional macro cells, sniffing is not supported while in existing small cells and femto cells, and service to and/or from subscriber devices must be completely interrupted for the full duration necessary to acquire the needed information. This causes an undesirable service interruption to those subscriber devices. Therefore, an exemplary node is provided herein for performing sniffing, while minimizing service interruptions.

Exemplary Wireless Communication Node

Figure 2:
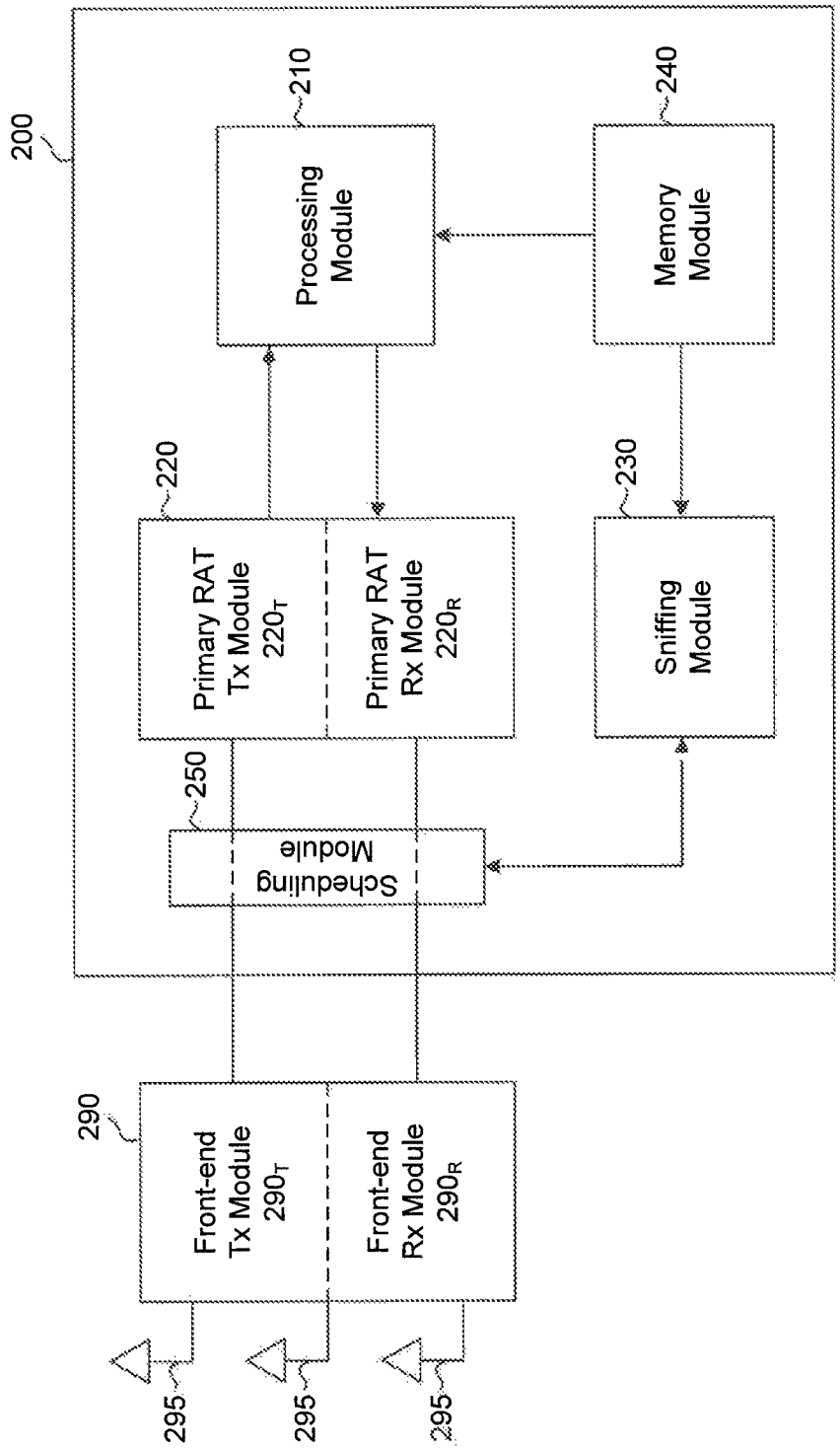
FIG. 2 illustrates a block diagram of an exemplary cellular node that may be employed within the wireless communication environment according to an exemplary embodiment.

FIG. 2 illustrates a block diagram of an exemplary cellular node 200 that may be employed within the wireless communication environment 100 according to an exemplary embodiment, and which may represent an exemplary embodiment of a base station, as discussed above. The cellular node 200 includes a processing module 210, primary radio access technology module (RAT) 220, a sniffing module 230, a memory module 240, and a scheduling module 250. The cellular node 200 also includes a front-end module 290 connected between the primary RAT module 220 and one or more antennas 295.

The antennas 295 receive wireless signals from the wireless communication environment, which are front-end processed by the front-end receiver (Rx) module 290R including, for example, frequency down-conversion by one or more mixers using a local oscillator, amplification by one or more amplifiers, filtering by one or more filters, and analog-to-digital conversion by an A/D converter. The front-end Rx module 290R forwards the received signals to the primary RAT module 220, and specifically to the Primary RAT Rx module 220R, which can perform additional processing on the received signal before forwarding the received signals to the processing module 210. The processing module 210 performs general processing on the received signals, such as command execution, data retrieval, rerouting, etc.

Either one of the Primary RAT Rx module 220R or the processing module 210 may also include a Fast Folder Transform (FFT) module to provide a representative frequency spectrum analysis of the received wireless signals. Based on the frequency spectrum, strong or weak signals and their corresponding frequencies can be identified so as to provide a starting point for the sniffing operation described herein. In other words, the frequency scanning performed during the sniffing operation can be focused, at least initially, on the strong signals discovered by the FFT, so as to lessen the scanning time for sniffing.

The cellular node 200 transmits signals in a corresponding manner. Information generated by the processing module 210 is processed by the primary RAT module 220 (specifically, the primary RAT Tx module 220T). The primary RAT module 220 forwards the outgoing signals to the front-end Tx module 290T via the scheduling module 250. The front-end Tx module 290T performs front-end processing on the outgoing signals, and then transmits the processed signals to the wireless communication environment 100 via the antennas 295. For example, the Tx module 290T can perform frequency upconversion by one or more mixers using a local oscillator, amplification by one or more amplifiers, filtering by one or more filters, and digital-to-analog conversion by a D/A converter.

The scheduling module 250 may include a scheduler. The scheduler can be an essential component in 3G and LTE. The scheduler may determine which subscriber device is using a particular time transmit interval (TTI), which is defined as 1 ms in LTE. The scheduler may also decide which subscriber device is going to transmit on uplink, or determines to which user the cellular node 200 will transmit on downlink, for each TTI. In other words, the scheduler determines who will transmit at which times. In the exemplary embodiment, the scheduling module 250 serves additional purposes. Specifically, the scheduling module 250 facilitates opportunistic sniffing by the sniffing module 230, as will be discussed in further detail below.

In many RATs, and specifically in LTE, there are rarely significant periods of idling time at the cellular node that will allow the sniffing module 230 sufficient time for acquiring and processing all the data needed to perform adequate analysis. Therefore, the exemplary scheduling module 250 monitors data traffic on the transmit and receive paths in order to detect any temporary communication gaps that may occur. In other words, the scheduling module 250 determines when the transmit and/or receive paths of the cellular node are not being occupied by communications. When a gap is detected, the scheduling module 250 causes the sniffing module 230 to perform a sniffing operation, or a portion of the sniffing operation, during the gap.

Once notified of a gap by the scheduling module 250, the sniffing module 230 causes one or both of the front-end Tx module 290T and the front-end Rx module 290R to perform sniffing of nearby base stations. In an embodiment, the front-end Tx module 290T continues to transmit communication data on the primary RAT (e.g., LTE), and sniffing is only performed by the front-end Rx module 290R. In this same embodiment, the scheduling module 250 need only detect gaps in the receive path in order to determine the availability of the front-end Rx module 290R.

As discussed above, an FFT may be performed on the receive signals to focus the sniffing operation during the gap. For example, strong signals discovered by the FFT analysis, that are at or near known RAT frequencies, may be priority candidates for sniffing. Therefore, the receiver components in the receiver front-end module 290R can be first tuned to these priority frequency candidates during the sniffing operation, before sniffing other frequencies. For example, the local oscillator used for signal down-conversion can be tuned to capture these priority frequency candidates. Likewise, various filters and amplifiers in the receiver front-end module 290R can also be tuned based on the FFT analysis.

LTE permits two types of communication schemes. In a full duplex configuration, data can be transmitted and received in parallel. On the other hand, in time-division duplex (TDD) some time periods are allocated for uplink and some time periods are allocated for downlink. FIG. 3 illustrates exemplary timing charts for performing sniffing by the cellular node 200 according to an exemplary embodiment. Specifically, FIG. 3A illustrates the sniffing operation timing when performed in a full duplex configuration, whereas FIG. 3B illustrates the sniffing operation timing when performed in the TDD configuration.

Figure 3A:
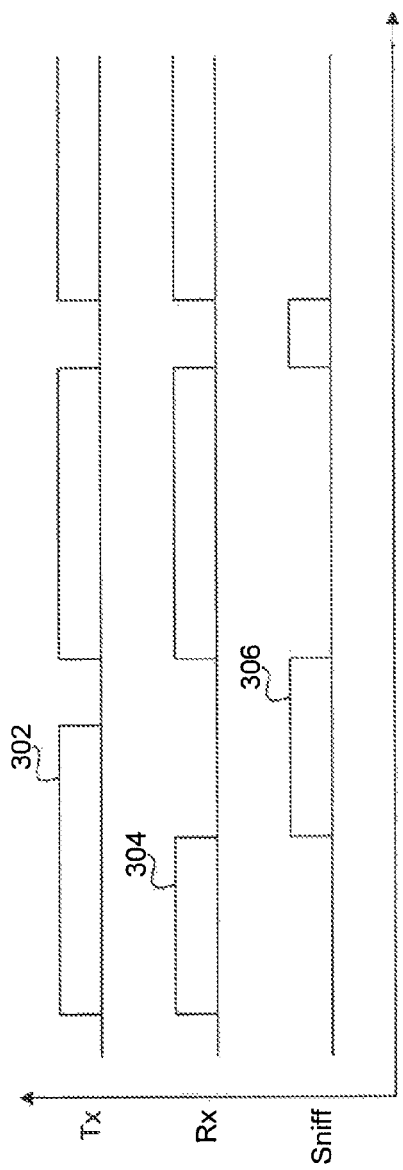
FIG. 3A illustrates an exemplary timing chart for performing sniffing by the cellular node according to an exemplary embodiment.

As shown in FIG. 3A, in the full duplex configuration, communication data is being transmitted 302 and received 304 at the same time for several time periods. In this scenario, the scheduling module 250 monitors for gaps 306 in data reception in order to perform the sniffing on the receive chain. Once a gap 306 is detected in the receive path, the scheduling module 250 notifies the sniffing module 230, which then performs at least a portion of the sniffing operation during the gap. As can be seen from FIG. 3A, the sniffing module 230 can perform the sniffing operation during the receive gap even while communication data continues to be transmitted on the transmit path.

Figure 3B:
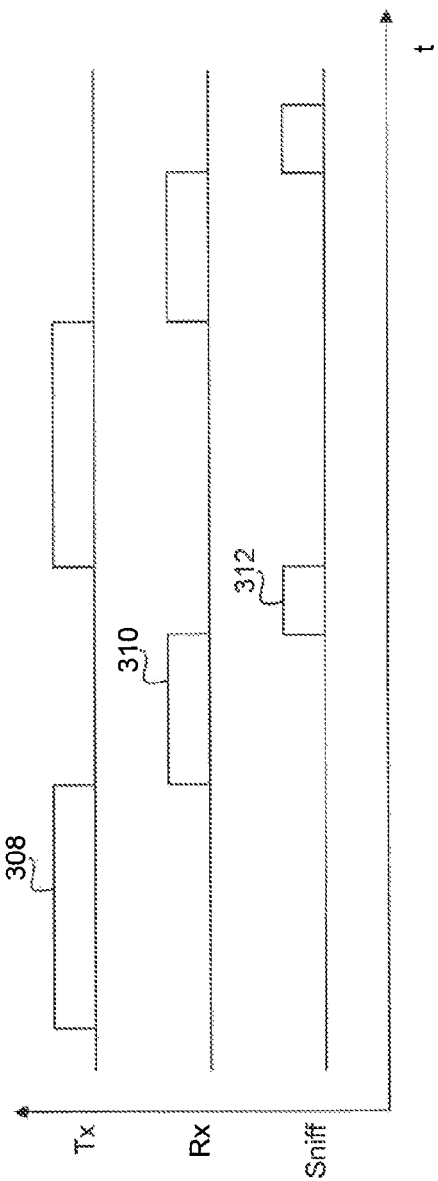
FIG. 3B illustrates an exemplary timing chart for performing sniffing by the cellular node according to an exemplary embodiment.

As shown in FIG. 3B, in the TDD configuration, time slots are allocated between the transmission and reception of communication data. Therefore, in the example, the cellular node 200 transmits communication data during a first period 308 and receives communication data during a second period 310. The scheduling module 250 in this example monitors for a gap 312 in which communication data is neither being transmitted nor received, such as for the period 312 immediately following the second period 310 (first reception period). During the detected gap 312, the sniffing module 230 performs at least a portion of the sniffing operation.

It should be noted that in the example of FIG. 3A, the sniffing module 230 must perform its sniffing operation in a different frequency from that on which communication data is being transmitted by the cellular node 200. Specifically, because there may be time periods during which sniffing is occurring at the same time as data transmission, these operations must be performed on different frequencies to minimize interference. In the example of FIG. 3B, however, sniffing can occur on the same frequency as either or both of the transmission and reception because the TDD configuration only allows one such operation to occur at any given time.

Whereas the primary RAT module 220 may be configured only for operating within the primary RAT (e.g., LTE), the sniffing module 230 may be configured to operate in many RATs, such as LTE, 3G, 2G, GSM, etc. Therefore, when the sniffing is performed, the sniffing module 230 is capable of scanning nearby base stations operating on various RATs. In other words, the sniffing module 230 can receive various frequencies used by nearby RATs to determine the signal characteristics of their corresponding basestations and therefore determine availability for handover, etc. For example, if the signal strength is too low (i.e. below a threshold) for a nearby basestation, then it may be not be a good candidate for a subscriber handover from the present basestation that is performing the sniffing operation.

If a given gap provides sufficient time duration to allow the sniffing module 230 to acquire enough information to adequately analyze nearby base stations, the sniffing module 230 may acquire the desired data and forward it directly to the processing module 210 for analysis. However, as discussed above, there may be insufficient time during any given gap to allow the sniffing module 230 to acquire all the necessary information to adequately analyze the nearby base stations. Therefore, the sniffing module 230 performs the sniffing using a "blinking" process, described in detail below.

As previously discussed, because of the traffic typical of an LTE system, gaps in communication are typically insufficient for performing a full sniffing operation. Therefore, in the exemplary cellular node 200, the sniffing module 230 can utilize any available gap to performing blinking as part of a larger overall sniffing operation. Specifically, blinking involves the sniffing module 230 acquiring a portion of the information needed for the sniffing operation during an available communication gap. During later gaps, additional portions can be acquired. The sniffing module 230 stores each portion in the memory module 240 until a sufficient amount of data has been accumulated to permit accurate analysis of the communication environment 100 and/or nearby base stations. Once there is sufficient information in the memory module 240, the processing module 210 can access the accumulated data in order to perform the sniffing analysis. Accordingly, "blinking" refers to performing the sniffing operation over snapshots of time, analogous to the blinking of an eye.

By way of example, if 10 ms worth of information are required for the sniffing operation, the sniffing module 230 may acquire 1 ms, 3 ms, 2 ms, 1 ms, 2 ms and 1 ms worth of that information over different communication gaps. The gaps may be consecutive or non-consecutive. After each acquisition, the data is stored in the memory module 240 until all 10 ms have been acquired. Once all 10 ms have been acquired, the processing module 210 performs the sniffing analysis.

By utilizing the blinking process, the sniffing module 230 is capable of performing sniffing even without any single block of time sufficient to acquire all needed information. In addition, communication can return to normal while the accumulated sniffing data, which is stored in the memory module 240, is analyzed by the processing module 210.

Although the above embodiment described opportunistic sniffing in which blinking is performed in available gaps, in another embodiment, the scheduling module 250 can create gaps for scheduling the sniffing module 230. This is particularly useful when sniffing is needed more quickly than opportunistic scheduling can provide.

Exemplary Method for Performing Opportunistic Sniffing

Figure 4:
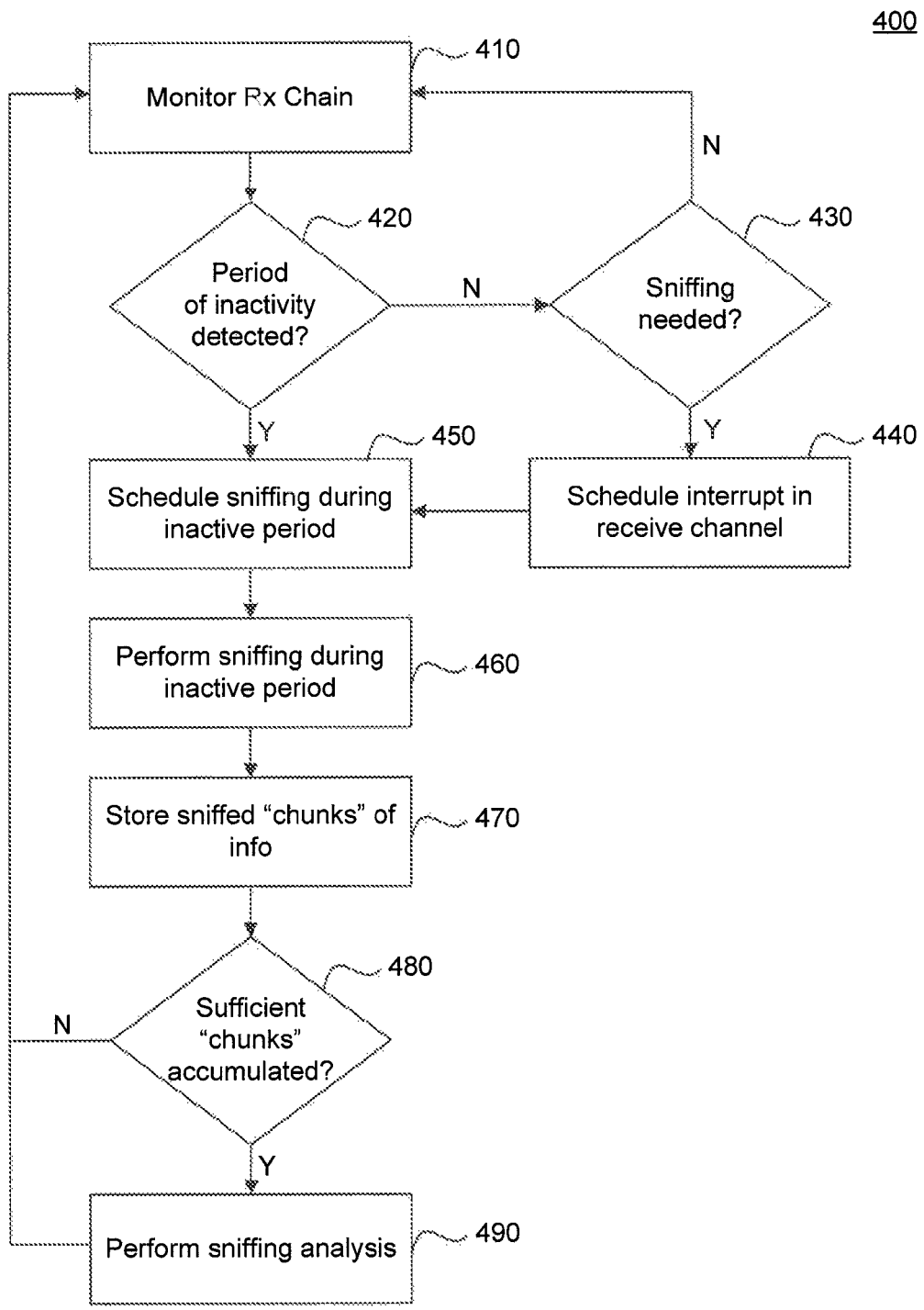
FIG. 4 illustrates a flowchart diagram of an exemplary method for performing opportunistic sniffing according to an exemplary embodiment.

FIG. 4 illustrates a flowchart diagram of an exemplary method 400 for performing opportunistic sniffing according to an exemplary embodiment. The method of FIG. 4 will now be described with reference to FIG. 2.

In order to perform the sniffing operation, the scheduling module 250 monitors the receive chain (410). During the monitoring, the scheduling module 250 detects for a period of inactivity (e.g., a gap) (420). If no gap is detected (420-N), a determination is made as to whether sniffing is needed (430). If no sniffing is needed, the scheduling module 250 continues to monitor the receive chain (410). If sniffing is needed, the scheduling module 250 proceeds to schedule an interrupt in the receive chain for the purpose of scheduling sniffing. The scheduler module 250 then schedules sniffing during the scheduled gap (450).

Alternatively, if a gap is detected (420-Y), the scheduling module 250 schedules a portion of the sniffing process to take place during the gap (450). During the gap, the sniffing module 230 performs at least a portion of the sniffing process. For example, the sniffing module 230 may acquire only a portion of the needed information during the gap. The acquired information "chunk" is then stored memory (470), such as in the memory module 240.

Once the gap has ended, and the information has been stored in memory, a determination can be made as to whether sufficient sniffing data has been acquired (480). For example, as discussed above, a total amount of data needed for accurate sniffing analysis may be acquired in chunks over several different gaps. Therefore, a determination is made after each chunk has been acquired as to whether the total needed data has been acquired.

If it is determined that the total needed data has not been acquired, the method repeats. Alternatively, if the total needed data has been acquired and stored, then the processing module 210 performs the sniffing analysis on the stored data (490). Once the sniffing analysis has completed, the method will typically repeat in order to perform future sniffing analyses.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
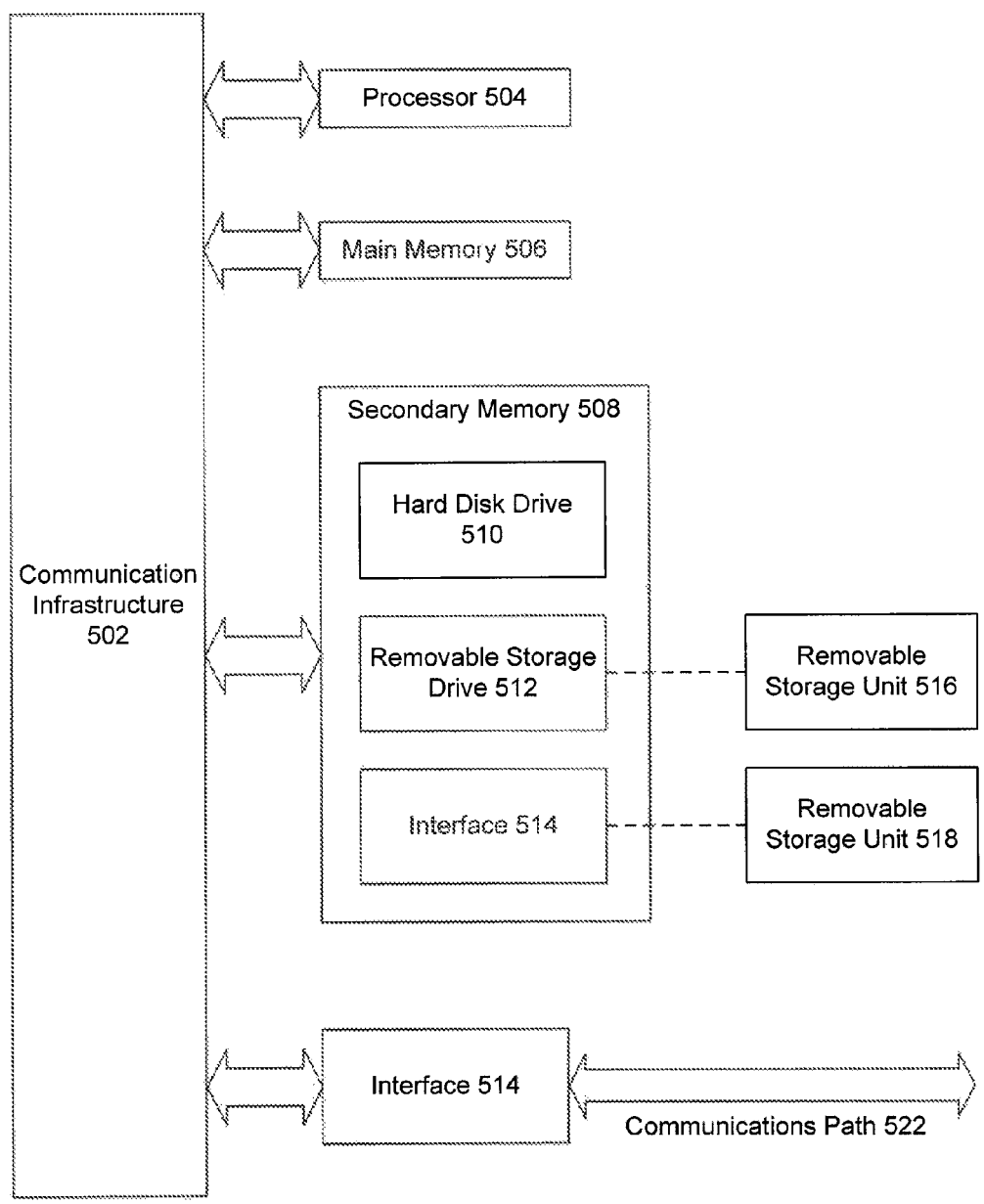
FIG. 5 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Further, the invention should not be limited by any of the above-described exemplary embodiments, but should be defined only in accordance with the following claims and their equivalents.

What is claimed is:

1. A wireless communication device, comprising:
a primary radio access technology (RAT) module having a transmit portion and a receive portion, the transmit portion configured to transmit communication data to a wireless communication environment on a transmit chain, and the receive portion configured to receive communication data from the wireless communication environment on a receive chain;
a scheduling module configured to monitor data traffic in at least one of the transmit chain or the receive chain and detect a plurality of gaps in the data traffic; and
a sniffing module configured to opportunistically acquire portions of a preferred amount of sniffed data during corresponding ones of the plurality of gaps in the data traffic,
wherein the plurality of gaps in the data traffic are not prescheduled with the wireless communications device in advance of being detected by the scheduling module.

2. The wireless communication device of claim 1, wherein the plurality of gaps in the data traffic are each smaller in duration than a total time required for obtaining the preferred amount of sniffed data,
wherein a portion of the sniffed data is less than the preferred amount of sniffed data, and
wherein the portion of the sniffed data is acquired during one of the plurality of gaps in the data traffic.

3. The wireless communication device of claim 2, further comprising a memory that stores the portion of sniffed data.

4. The wireless communication device of claim 3, wherein the portion of sniffed data is stored in the memory together with a plurality of previously acquired sniffed data portions that were acquired by the sniffing module during previous gaps in the data traffic.

5. The wireless communication device of claim 4, further comprising a processing module configured to combine the stored portion of the sniffed data with the plurality of previously acquired sniffed data portions that are stored in the memory, and to perform a sniffing analysis on the combined sniffed data.

6. The wireless communication device of claim 5, wherein the processing module is configured to perform the combination and sniffing analysis only after determining that an amount of the sniffed data stored in the memory is greater than or equal to the preferred amount of sniffed data.

7. The wireless communication device of claim 1, wherein the scheduling module is configured to detect the plurality of gaps in the data traffic only in the receive communication data, and
wherein the sniffing module is configured to acquire a first portion of the sniffed data only on the receive chain during one of the plurality of gaps.

8. The wireless communication device of claim 1, wherein the scheduling module is configured to detect the plurality of gaps in the data traffic in both the received communication data and the transmitted communication data, and
wherein the sniffing module is configured to acquire a first portion of the sniffed data during a time period in which gaps in the data traffic exist on both the receive chain and the transmit chain simultaneously.

9. The wireless communication device of claim 1, further comprising a memory that stores each of the portions of sniffed data; and
a processing module configured to:
determine whether the sniffed data stored in the memory is greater than or equal to the preferred amount of sniffed data; and
after the processing module determines that the sniffed data stored in the memory module is greater than or equal to the preferred amount of sniffed data, combine the stored plurality of the portions of sniffed data, and perform a data analysis on the combined sniffed data.

10. A wireless communication device, comprising:
a transmit chain configured to process and transmit outgoing data signals;
a receive chain configured to receive and process incoming data signals;
a scheduling module configured to monitor data traffic in at least one of the transmit chain or the receive chain and detect a plurality of gaps in the data traffic; and
a sniffing module configured to acquire a preferred amount of sniffed data by acquiring a plurality of portions of sniffed data during the plurality of the gaps in the data traffic,
wherein the plurality of gaps in the data traffic are not prescheduled with the wireless communication device in advance of being detected by the scheduling module.

11. The wireless communication device of claim 10, wherein the scheduling module is configured to monitor only the receive chain, and
wherein the plurality of gaps in the data traffic are monitored only in the receive chain.

12. The wireless communication device of claim 10, wherein the scheduling module is configured to monitor both the receive chain and the transmit chain, and
wherein the plurality of gaps in the data traffic are monitored in both the receive chain and the transmit chain.

13. The wireless communication device of claim 10, further comprising a memory module,
wherein the sniffing module is configured to store each of the plurality of the portions of sniffed data in the memory module.

14. The wireless communication device of claim 10, wherein the sniffing module is configured to notify the scheduling module during a period not having a gap that sniffing is needed, and
wherein the scheduling module is configured to schedule an interrupt in at least one of the transmit chain and the receive chain for allowing the sniffing module to acquire at least one of the plurality of portions of sniffed data during the scheduled interrupt.

15. A wireless communication device, comprising:
a memory module;
a transmit chain configured to process and transmit outgoing data signals;
a receive chain configured to receive and process incoming data signals;
a scheduling module configured to monitor at least one of the transmit chain and the receive chain for a plurality of gaps in the data signal;
a sniffing module configured to acquire a preferred amount of sniffed data by acquiring a plurality of portions of sniffed data over the plurality of the gaps, and store each of the plurality of the portions of sniffed data in the memory module; and
a processing module configured to determine whether the sniffed data stored in the memory module is greater than or equal to the preferred amount of sniffed data,
wherein, after the processing module determines that the sniffed data stored in the memory module is greater than or equal to the preferred amount of sniffed data, the processing module is configured to combine the stored plurality of the portions of sniffed data, and to perform a data analysis on the combined sniffed data.

16. A method of sniffing a wireless communication environment by a wireless communication device, the method comprising:

monitoring data traffic in at least one of a receive chain or a transmit chain to detect a plurality of gaps in the data traffic;

acquiring portions of a preferred amount of sniffed data during the plurality of gaps in the data traffic; and storing the portions of the preferred amount of sniffed data in a memory, wherein the plurality of gaps in the data traffic are not prescheduled with the wireless communication device in advance of being detected.

17. The method of claim 16, further comprising:

scheduling an interrupt in the at least one of the receive chain and the transmit chain when no gap is detected, and acquiring one of the portions of the preferred amount of sniffed data during the interrupt.

18. The method of claim 16, wherein the monitoring monitors only the receive chain, and wherein the acquiring is performed on the receive chain.

19. The method of claim 16, wherein the monitoring monitors both the receive chain and the transmit chain, and wherein the acquiring is performed only during periods in which both the receive chain and the transmit chain have gaps in their respective data traffic.

20. The method of claim 17, further comprising determining whether sniffing is needed, wherein the interrupt is only scheduled after determining that sniffing is needed.

21. A method of sniffing a wireless communication environment by a wireless communication device, the method comprising:

monitoring data traffic in at least one of a receive chain and a transmit chain for gaps in the data traffic;

acquiring portions of a preferred amount of sniffed data during a plurality of the gaps;

storing the portions of the preferred amount of sniffed data in a memory, determining, after each portion has been stored in memory, whether a total amount of stored sniffed data equals or exceeds the preferred amount of sniffed data;

after determining that the total amount of stored sniffed data equals or exceeds the preferred amount of sniffed data, combining the stored portions of sniffed data; and analyzing the combined sniffed data.

\* \* \* \* \*